US008311551B1

(12) United States Patent
Shetty et al.

(10) Patent No.: US 8,311,551 B1
(45) Date of Patent: Nov. 13, 2012

(54) SYSTEM AND METHOD FOR ADAPTIVE ROUTE UPDATING FOR ACCESS TERMINALS BASED ON MOBILITY AND CHANNEL LOADING

(75) Inventors: Manoj Shetty, Overland Park, KS (US); Bhagwan Khanka, Lenexa, KS (US); Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 229 days.

(21) Appl. No.: 12/757,471

(22) Filed: Apr. 9, 2010

(51) Int. Cl.
*H04Q 7/20* (2006.01)

(52) U.S. Cl. ..... 455/450; 455/458; 455/437; 455/456.1; 370/329

(58) Field of Classification Search .................. 455/437, 455/456.1, 458; 370/329
See application file for complete search history.

(56) References Cited

U.S. PATENT DOCUMENTS

| | | | | |
|---|---|---|---|---|
| 5,175,758 | A * | 12/1992 | Levanto et al. | 455/458 |
| 5,701,337 | A * | 12/1997 | Silver et al. | 455/426.1 |
| 5,802,469 | A * | 9/1998 | Nounin et al. | 455/422.1 |
| 5,828,949 | A * | 10/1998 | Silver et al. | 455/433 |
| 7,990,921 | B1 * | 8/2011 | Sarkar et al. | 370/329 |
| 2005/0186961 | A1 | 8/2005 | Aikawa et al. | |
| 2005/0213590 | A1 | 9/2005 | Hauenstein et al. | |
| 2006/0199596 | A1 | 9/2006 | Teauge et al. | |
| 2007/0249329 | A1 | 10/2007 | Zou | |
| 2008/0032713 | A1 * | 2/2008 | Yang | 455/458 |
| 2008/0207227 | A1 | 8/2008 | Ren et al. | |
| 2009/0116391 | A1 | 5/2009 | Bakker et al. | |
| 2009/0129307 | A1 * | 5/2009 | Akhtar et al. | 370/312 |
| 2009/0201842 | A1 * | 8/2009 | Guan | 370/310 |
| 2009/0219888 | A1 | 9/2009 | Chen et al. | |
| 2009/0264134 | A1 * | 10/2009 | Xu et al. | 455/437 |
| 2009/0323530 | A1 | 12/2009 | Trigui et al. | |
| 2010/0017578 | A1 * | 1/2010 | Mansson et al. | 711/171 |
| 2010/0222074 | A1 * | 9/2010 | Ramachandran et al. | 455/456.1 |
| 2011/0263242 | A1 * | 10/2011 | Tinnakornsrisuphap et al. | 455/422.1 |
| 2012/0094666 | A1 * | 4/2012 | Awoniyi et al. | 455/435.1 |

OTHER PUBLICATIONS

3rd Generation Partnership Project 2 "3GPP2", cdma2000 High Rate Packet Data Air Interface Specification, Version 3.0, Sep. 2006.
Dai Libin, Building a Mobile IP RAN Transport Network, Solution, Version 33, Aug. 2007.
Charan Langton, Intuitive Guide to Principles of Communications, Code Division Multiple Access (CDMA), The Concept of Signal Spreading and its uses in communications, 2002.
3G Wireless Radio Network Controller, AdvancedTCA* Line Cards for 3G Networks, Aug. 29, 2002.
U.S. Appl. No. 12/757,377, filed Apr. 9, 2010 and entitled "System and method for dynamic route-update radius parameters."

* cited by examiner

*Primary Examiner* — Charles Shedrick (57) ABSTRACT

Wireless access terminals operating in a radio access network (RAN) may move from one coverage area to another coverage area formed by base stations within the RAN. The RAN tracks the location of the access terminals so that RAN can efficiently route communications, such as page messages, to a base station serving the access terminals. From time-to-time, the access terminals can send route-update messages to inform the RAN of their locations. Sending the route-update messages can increase the loading on base station channels that carry the messages. Methods, systems, and devices for delaying transmission of the route-update messages are described. Delaying or not delaying transmission of the route-update messages may be dependent on occupancy of access channels of a base station and whether the access terminals are mobile at the time the route-update messages are to be sent.

20 Claims, 5 Drawing Sheets

SYSTEM AND METHOD FOR ADAPTIVE ROUTE UPDATING FOR ACCESS TERMINALS BASED ON MOBILITY AND CHANNEL LOADING

REFERENCE TO RELATED APPLICATION

This application was filed on the same date as U.S. patent application Ser. No. 12/757,377, which is hereby incorporated by reference in its entirety and is entitled system and method for dynamic route-update-radius parameters.

BACKGROUND

Access terminals, such as cell phones and wireless personal digital assistants (PDAs), are operable to communicate with radio access networks, such as cellular wireless networks. These access terminals and access networks typically communicate with each other over a radio frequency (RF) air interface according to a wireless protocol such as 1x Evolution Data Optimized (1x Ev-DO), perhaps in conformance with one or more industry specifications such as IS-856, Revision 0, IS-856, Revision A, and IS-856, Revision B. Other wireless protocols may be used as well, such as Code Division Multiple Access (CDMA), Global System for Mobile Communications (GSM), Time Division Multiple Access (TDMA), or some other wireless protocol.

Access networks typically provide services such as voice, text messaging (such as Short Message Service (SMS) messaging), and packet-data communication, among others. Access networks typically include a plurality of base stations, each of which forms one or more coverage areas, such as cells and sectors (that is, individual areas of a cell that allow the cell to carry more calls). When an access terminal is positioned in one of these coverage areas, it can communicate over the air interface with the base station (BS), and in turn over a signaling network or a transport network, or both. The signaling network may be a circuit-switched network, a packet-switched network or a combination of both. Similarly, the transport network may be a circuit-switched network, a packet-switched network or a combination of both.

Access terminals and access networks may conduct communication sessions (for example, voice calls and data sessions) over a pair of frequencies known as carriers, with a BS of an access network transmitting to an access terminal on one of the frequencies, and the access terminal transmitting to the BS on the other. This is known as frequency division duplex (FDD). A BS-to-access-terminal communication link is known as the forward-link, while an access-terminal-to-BS communication link is known as the reverse-link. The carriers may be segmented into various channels, such as pilot channels, sync channels, paging channels, control channels, traffic channels, access channels, and other channels.

Access terminals may be mobile such that the access terminals can be transported between different coverage areas formed by the same or different base stations. A given coverage area may reach a capacity for carrying out communications if too many access terminals are carrying out and/or are trying to carry out communications in the given coverage area.

OVERVIEW

An access terminal may be arranged to delay transmission of communications such that the access terminal does not increase the communications load of a coverage area formed by a base station. In particular, the access terminal may be arranged to delay transmission of the communications after determining whether the occupancy of a given channel to or from the base station exceeds a channel occupancy threshold and after determining whether the access terminal is mobile or not mobile. If the occupancy of the given channel exceeds the channel occupancy threshold and if the access terminal is mobile, the access terminal may delay transmission of the communications. During the transmission delay, the access terminal may move to another coverage area in which the channels are not occupied above the channel occupancy threshold, and/or the occupancy of the given channel may decrease.

In one respect, an example embodiment may take the form of a method comprising an access terminal transmitting a first route-update message to a first base station, wherein the first base station is associated with a first route-update-radius, and the access terminal determining that a distance between the first base station and a second base station exceeds the first route-update-radius and the access terminal determining whether an occupancy of a channel to or from the second base station exceeds a channel occupancy threshold.

Further, the method includes, if the access terminal determines that the occupancy of the channel to or from the second base station does not exceed the channel occupancy threshold, then the access terminal transmitting a second route-update message to the second base station without performing a transmission delay.

Further still, the method includes, if the access terminal determines that the occupancy of the channel to or from the second base station exceeds the channel occupancy threshold, then the access terminal determining whether the access terminal is mobile, and if the access terminal determines that the access terminal is mobile, then the access terminal transmitting the second route-update message after performing the transmission delay, otherwise, if the access terminal determines that the access terminal is not mobile, then the access terminal transmitting the second route-update message to the second base station without performing the transmission delay.

In another respect, an example embodiment may take the form of a system comprising an access terminal that is operable to transmit a first route-update message to a first base station, wherein the first base station is associated with a first route-update-radius, wherein the access terminal is operable to make a determination that a distance between the first base station and a second base station exceeds the first route-update-radius, and wherein the access terminal is operable to determine whether an occupancy of a channel to or from the second base station exceeds a channel occupancy threshold.

If the access terminal determines that the occupancy of the channel to or from the second base station does not exceed the channel occupancy threshold, then the access terminal is operable to transmit a second route-update message to the second base station without performance of a transmission delay. If the access terminal determines that the occupancy of the channel to or from the second base station exceeds the channel occupancy threshold, then the access terminal is operable to determine whether the access terminal is mobile, and if the access terminal determines that the access terminal is mobile, then the access terminal is operable to transmit the second route-update message after performance of the transmission delay, otherwise, if the access terminal determines that the access terminal is not mobile, then the access terminal is operable to transmit the second route-update message to the second base station without performance of the transmission delay.

In yet another respect, an example embodiment may take the form of a wireless access terminal comprising (i) a transceiver operable to transmit a first route-update message to a first base station, (ii) a processor operable to execute computer-readable program instructions, and (iii) a computer-readable data storage device operable to store the computer-readable program instructions and a first route-update-radius associated with the first base station.

The computer-readable program instructions comprise first instructions executable by the processor to determine that a distance between the first base station and a second base station exceeds the first route-update-radius. The computer-readable program instructions comprise second instructions executable by the processor to determine whether an occupancy of a channel to or from the second base station exceeds a channel occupancy threshold. The computer-readable program instructions comprise third instructions executable by the processor to cause the transceiver to transmit a second route-update message to the second base station without performance of a transmission delay. The computer-readable program instructions comprise fourth instructions executable by the processor to (i) determine whether the access terminal is mobile, and (ii) if the processor determines that the access terminal is mobile, cause the transceiver to transmit the second route-update message after performance of the transmission delay, otherwise, if the processor determines that the access tei urinal is not mobile, cause the transceiver to transmit the second route-update message to the second base station without performance of the transmission delay.

The processor is operable to execute the third instructions if the processor determines that the occupancy of the channel to or from the second base station does not exceed the channel occupancy threshold. The processor is operable to execute the fourth instructions if the processor determines that the occupancy of the channel to or from the second base station exceeds the channel occupancy threshold.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments of the invention are described herein with reference to the drawings, in which.

DETAILED DESCRIPTION

I. Introduction

A radio access network (RAN) may include a plurality of base stations. Each of the base stations forms one or more coverage areas (for example, cells or sectors) such that the RAN, by way of the plurality of base stations, forms a plurality of coverage areas. Wireless access terminals may be moved from one coverage area to another coverage area such that the wireless access terminals are operable in the plurality of coverage areas. As a quantity of wireless access terminals operating in a given coverage area increases and/or as the quantity of communications carried out in the given coverage area increases, the capacity for carrying out additional communications in the given coverage area may decrease.

The RAN can maintain routing information that indicates which coverage area each wireless access terminal is operating. The routing information can be used by the RAN to route a message, such as a page message for a given access terminal, to a base station that can transmit the page message in the coverage area where the given access terminal is operating. When an access terminal moves from one coverage area to another coverage area, the routing information can be modified so that the routing information continues to indicate which coverage area the access terminal is operating.

The RAN can determine the routing information from route-update messages that access terminals transmit to a base station via reverse-link communications. Delaying those reverse-link communications while channels of the base station are occupied above a channel occupancy threshold may prevent the access terminal from increasing the occupancy of those channels.

Ii. Example Architecture

Figure 1:
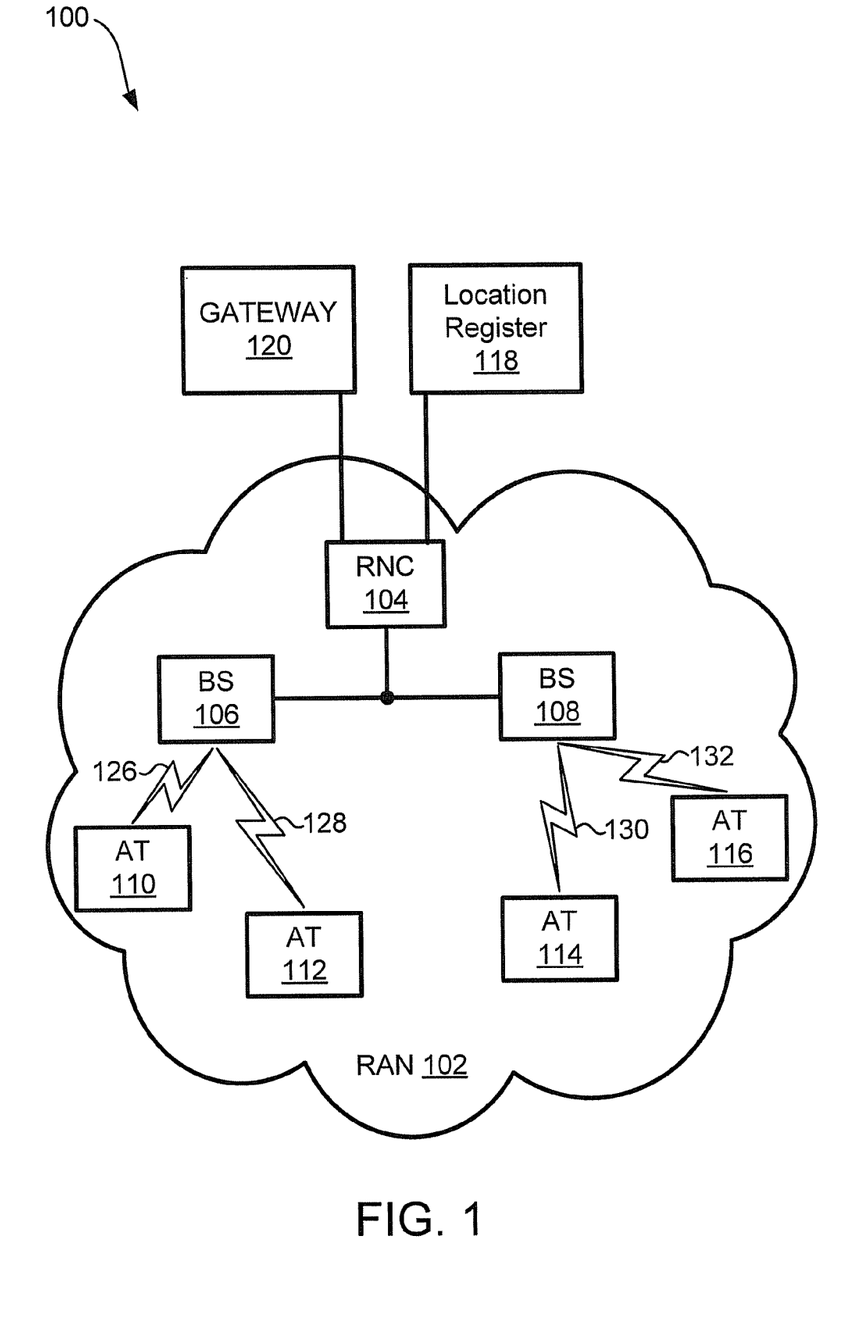
FIG. 1 is a block diagram of an example communication network in accordance with an example embodiment.

FIG. 1 is a block diagram of an example communication network 100 in accordance with an example embodiment. It should be understood, however, that the block diagram of FIG. 1 and other block diagrams and flow charts are provided merely as examples and are not intended to be limiting. Many of the elements illustrated in the figures and/or described herein are functional elements that may be implemented as discrete or distributed components or in conjunction with other components, and in any suitable combination and location. Those skilled in the art will appreciate that other arrangements and elements (for example, machines, interfaces, functions, orders, and groupings of functions, etc.) can be used instead. Further more, various functions described as being performed by one or more elements may be carried out by a processor executing computer-readable program instructions and/or by any combination of hardware, firmware, and software.

As illustrated in FIG. 1, communication network 100 includes a radio access network (RAN) 102. RAN 102 includes a radio network controller (RNC) 104 and base stations 106 and 108, but is not so limited. For instance, RAN 102 may include one or more other radio network controllers and one or more other base stations. Each RNC manages one or more base stations and may manage handoffs of access terminals from one RNC to another RNC.

Each base station of RAN 102 may carry out wireless communications with one or more wireless access terminals (or more simply, access terminals) via a radio frequency (RF) air interface. FIG. 1 illustrates base station 106 carrying out wireless communications with access terminal 110 via RF air interface 126 and with access terminal 112 via RF air interface 128. Similarly, FIG. 1 illustrates base station 108 carrying out wireless communications with access terminal 114 via RF air interface 130 and with access terminal 116 via RF air interface 132. By way of example, RF air interfaces 126, 128, 130, and 132 may carry out wireless communications according to the 1x Ev-DO wireless protocol and/or some other wireless protocol.

Access terminals 110, 112, 114, and 116 may include wireless access terminals that are operable in (i) an active mode (for example, a mode in which a voice communication or data session is being carried out by the wireless access terminal), and (ii) an idle mode (for example, a mode in which a voice communication or data session is not being carried out by the wireless access terminal). Access terminals 110, 112, 114, and 116 may be arranged as (i) a cellular telephone, (ii) a personal digital assistant, (iii) a laptop personal computer using a RAN interface, such as a U301 USB Device Sprint 3G/4G Mobile Broadband interface sold by the Sprint Nextel Corporation, Overland Park, Kans., United States, or (iv) some other wireless access terminal.

Figure 2:
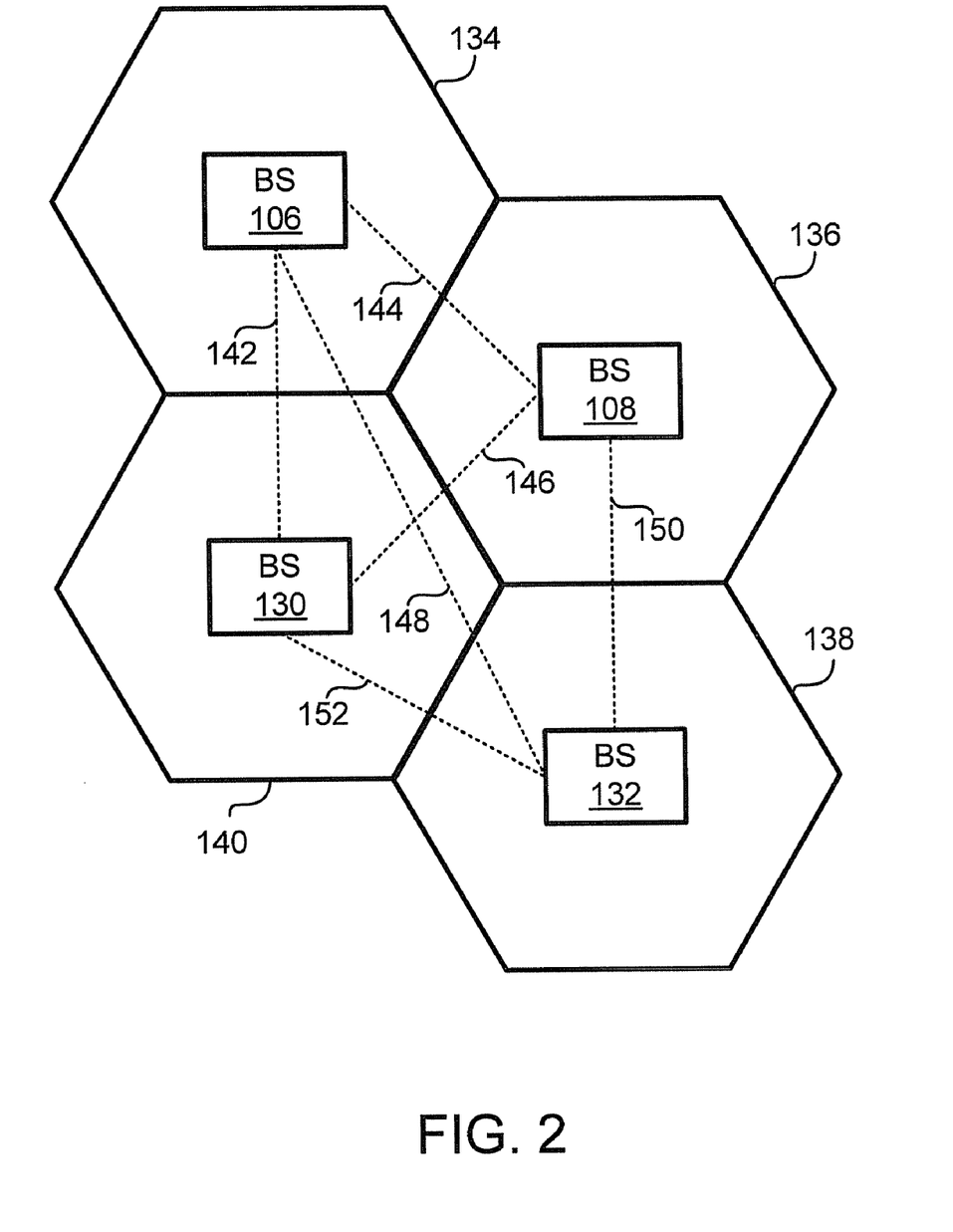
FIG. 2 illustrates a plurality of wireless access coverage areas in accordance with an example embodiment.

In addition to base stations 106 and 108, RNC 104 may be connected to other devices such as (i) a location register 118, (ii) a gateway 120, and (iii) one or more other base stations, such as base stations 130 and 132 (shown in FIG. 2). In this regard, RAN 102 includes base stations 130 and 132.

Location register 118 may comprise one or more databases containing information regarding each access terminal that is authorized to use RAN 102. The one or more databases of location register 118 may be distributed and located at different locations of RAN 102. Location register 118 may comprise a visitor location register (VLR), a home location register (HLR), and/or some other type of location register.

The information contained at location register 118 may include identification numbers associated with the access terminals, such as a mobile identification number (MIN), an electronic serial number (ESN), an international mobile subscriber identity (IMSI) number, or some other number. The information contained at location register 118 may include routing information associated with a route being taken by each access terminal. The routing information may indicate a location where each access terminal is located. Each access terminal may communicate the routing information to a base station via a route-update message. Upon receiving the route-update message, the base station may transmit the route-update message or information contained within the route-update message to RNC 104 for transmission, in turn, to location register 118. One or more of the databases of location register 118 may be co-located with gateway 120.

Gateway 120 may provide switching means for connecting RAN 102 to one or more other networks. For example, gateway 120 may comprise a mobile switching center (MSC) that includes a switch for switching voice calls and communication sessions between RAN 102 and another network, such as a public switched telephone network (PSTN). As another example, gateway 120 may comprise a packet data network gateway, such as a packet data serving node (PDSN) or a serving GPRS (general packet radio service) support node (SGSN), for switching voice calls and communication sessions between RAN 102 and a packet data network.

Next, FIG. 2 illustrates a plurality of wireless coverage areas that are formed by base stations of RAN 102. The wireless coverage areas include wireless coverage area 134 formed by base station 106, wireless coverage area 136 formed by base station 108, wireless coverage area 138 formed by base station 132, and wireless coverage area 140 formed by base station 130. Although FIG. 2 does not illustrate any overlap of wireless coverage areas 134, 136, 138, and 140, the wireless coverage areas are not so limited. For example, two more of wireless coverage areas 134, 136, 138, and 140 may overlap such that a single location (for example, a building or an intersection of two roads) is included within the two or more coverage areas. Base stations 130 and 132 may be connected to RNC 104 or to anther RNC of RAN 102.

FIG. 2 includes dotted lines that extend between the base stations. The dotted lines represent distances 142, 144, 146, 148, 150, and 152 between the base stations. For example, the dotted line connected between base station 106 and base station 130 represents distance 142, which is the distance between base station 106 and base station 130. As an example, distance 142 is 10 kilometers (km), distance 144 is 9 km, distance 146 is 7 km, distance 148 is 21 km, distance 150 is 10 km, and distance 152 is 7 km.

Base stations 106, 108, 130, and 132 are each associated with a route-update-radius. For example, the route-update-radius associated with base station 106 may be 7 km, the route-update-radius associated with base station 108 may be 9 km, the route-update-radius associated with base station 130 may be 12 km, and the route-update-radius associated with base station 132 may be 10 km. Other examples of the route-update-radii are also possible.

The route-update-radius associated with each base station may be changed from one value to another value. A base station may determine to change its route-update-radius or some other device, for example RNC 104, may determine that the base station is to change the route-update-radius and thereafter instruct the base station to change its route-update-radius.

Base stations 106, 108, 130, and 132 are operable to notify access terminals operating within the coverage areas 134, 136, 140, and 138, respectively, of the respective location of the base station. The base stations may transmit a sector-parameters message or some other message to the access terminals so as to provide the access terminals with the base station location information and route-update-radius information. The base stations may also provide access terminals with data that indicates an occupancy measurement for channels to or from those base stations.

Figure 3:
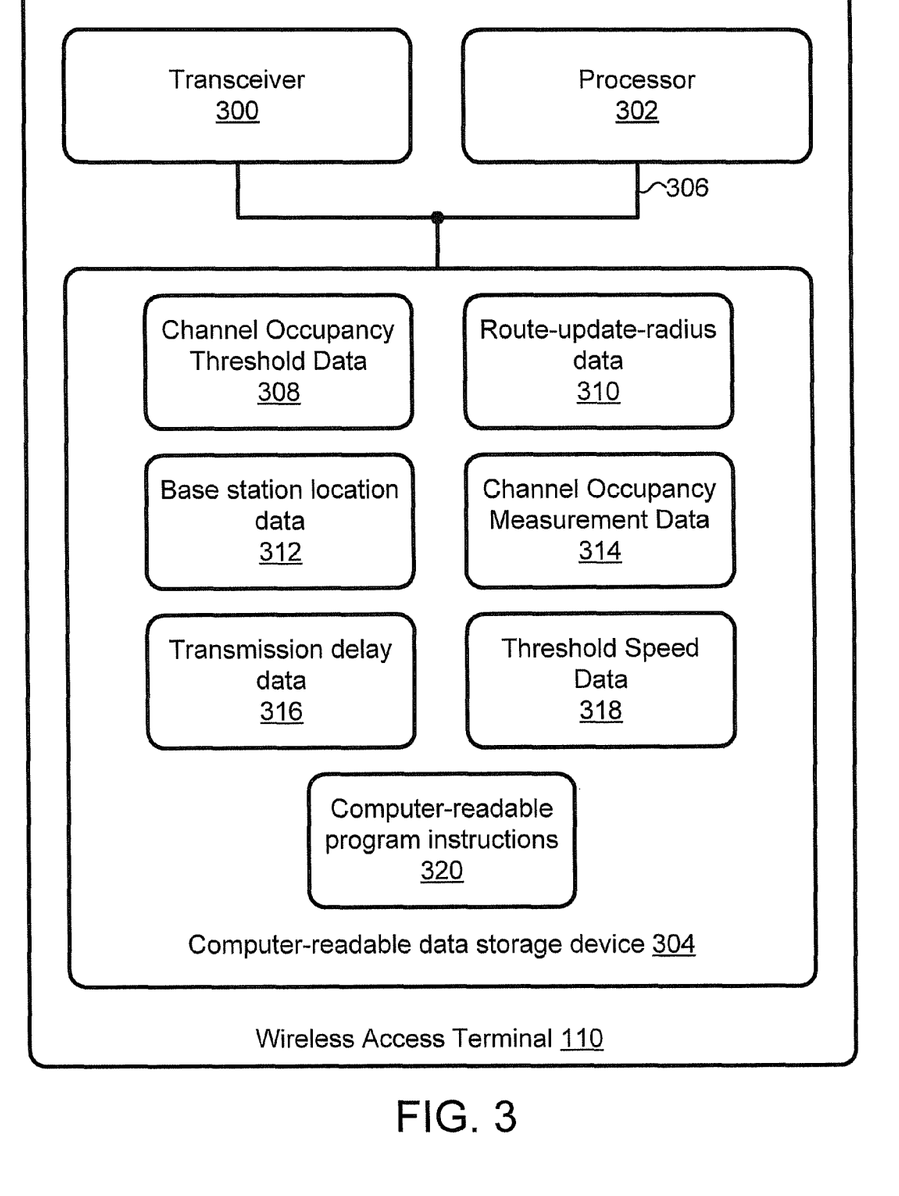
FIG. 3 is a block diagram of an example wireless access terminal.

Next, FIG. 3 is a block diagram of wireless access terminal 110. One or more other access terminals that are operable in operable in RAN 102 (for example, access terminals 112, 114, and 116) or operable in another RAN may be arranged like access terminal 110. As illustrated in FIG. 3, access terminal 110 includes a transceiver 300, a processor 302, and a computer-readable data storage device 304, all of which may be linked together via a system bus, network, or other connection mechanism 306. For purposes of this description, the functions carried out by transceiver 300, processor 302, and computer-readable data storage device 304 comprise functions that may be referred to as functions carried out by access terminal 110.

Transceiver 300 comprises a transmitter and a receiver. The transmitter and the receiver may be integrated (for example, combined) into a single component within access terminal 110. Alternatively, the transmitter and the receiver of transceiver 300 may be separate components within access terminal 110. Transceiver 300 may include, connect to, or include and connect to one or more antennas, one or more amplifiers, and one or more filters.

Transceiver 300 is operable to receive various data (for example, voice communications, data communications, and messages) from a base station that forms a coverage area where access terminal 110 is operating. The data communications may include text messages, such as short message service (SMS) messages, e-mail messages, and multimedia messaging service (MMS) messages.

The messages received by transceiver 300 may include sector-parameters messages generated by a base station. The sector-parameters messages may be arranged in any of a variety of formats. For example, the sector-parameters messages may be arranged in a format that includes data described in the cdma2000 High Rate Packet Data Air Interface Specification, 3GPP2 C.S0024-A, Version 3.0, September 2006, by 3$^{rd}$ Generation Partnership Project 2. Section 8.9.6.2.2 (SectorParameters) of the cdma2000 High Rate Packet Data Air Interface Specification, 3GPP2 C.S0024-A, Version 3.0, September 2006, is incorporated herein by reference. The other formats for arranging sector-parameters messages may include some or all of the data defined by section 8.9.6.2.2 of the foregoing specification.

As described in section 8.9.6.2.2 of the foregoing specification, a sector-parameters message may include a plurality of fields such as a sectorID field, a latitude field, a longitude field, a route-update-radius-overhead field, and one or more other fields. The sectorID field may include a sector address identifier. Access terminal 110 may use the sector address identifier to uniquely identify a sector of the base station that transmits the sector-parameters message transmitted to and received by transceiver 300. Other data, such as a channel identifier, may be used with the sector address identifier to uniquely identify the sector.

The latitude field may identify the latitude of a base station that transmits the sector-parameters message to transceiver 300. As an example, the base station's latitude may be defined in units of 0.25 seconds. The range of the latitude field may be −1296000 to 1296000 inclusive (corresponding to a range of −90° to +90°). A latitude field having a positive value can represent North latitudes. A latitude field having a negative value can represent South latitudes. After receiving a sector-parameters message, data contained in the latitude field may be stored as base station location data 312.

The longitude field may identify the longitude of the base station that transmits the sector-parameters message to transceiver 300. As an example, the base station's longitude may be defined in units of 0.25 seconds. The range of the longitude field may be −2592000 to 2592000 inclusive (corresponding to a range of −180° to +180°). A longitude field having a positive value can represent East longitudes. A longitude field having a negative value can represent West longitudes. After receiving a sector-parameters message, data contained in the longitude field may be stored as base station location data 312.

The route-update-radius-overhead field may comprise a zero value or a non-zero value. A zero value may indicate that access terminals are not to perform distance-based route updates. Non-zero values may indicate the distance beyond which access terminals are to send a new route-update-message. As an example, for base station 106, the non-zero value may indicate that the route-update radius is 7 km.

Additionally or alternatively, the sector-parameters messages may be arranged in a format that includes any of the following data: channel occupancy threshold data 308, channel occupancy measurement data 314, transmission delay data 316, and threshold speed data 318. Examples of those data are provided below.

Transceiver 300 is operable to transmit various data (for example, voice communications, data communications, and messages) to a base station that forms a coverage area where access terminal 110 is operating. As an example, the transceiver 300 may transmit route-update messages to a base station. The route-update messages notify the base station and RAN 102 of the current location of access terminal 110 and provide the base station and RAN 102 with an estimate of the radio link conditions surrounding access terminal 110. The route-update messages may be arranged in any of a variety of formats, such as the format described in the cdma2000 High Rate Packet Data Air Interface Specification, 3GPP2 C.S0024-A, Version 3.0, September 2006, by 3$^{rd}$ Generation Partnership Project 2. Section 8.7.6.2.1 (RouteUpdate) of the cdma2000 High Rate Packet Data Air Interface Specification, 3GPP2 C.S0024-A, Version 3.0, September 2006, is incorporated herein by reference. The other formats for arranging route-update messages may include some or all of the data defined by section 8.7.6.2.1 of the foregoing specification.

Processor 302 may comprise one or more general purpose processors (for example, INTEL microprocessors) and/or one or more special purpose processors (for example, digital signal processors). Processor 302 is operable to execute computer-readable program instructions, such as computer-readable program instructions 320.

Data storage device 304 may comprise a computer-readable storage medium readable by processor 302. The computer-readable storage medium may comprise volatile and/or non-volatile storage components, such as optical, magnetic, organic or other memory or disc storage, which can be integrated in whole or in part with processor 302.

Data storage device 304 contains various data. As illustrated in FIG. 3, data storage device 304 contains channel occupancy threshold data 308, route-update-radius data 310, base station location data 312, channel occupancy measurement data 314, transmission delay data 316, threshold speed data 318, and computer-readable program instructions 320.

Channel occupancy threshold data 308 may comprise data that identifies channel occupancy thresholds for one or more channels. In one respect, the one or more channels may comprise channels within the coverage area where access terminal 110 is currently operating. In another respect, the one or more channels may comprise one or more channels of a coverage area where access terminal 110 was previously operating and/or one or more channels of some other coverage area, such as a coverage area neighboring the coverage area where access terminal 110 is currently operating. The one or more channels that correspond to the channel occupancy thresholds may comprise a reverse-link access channel, a forward-link control channel, and/or some other channel. Channel occupancy threshold data 308 may also comprise channel identifier data that identifies the channel that corresponds to each channel occupancy threshold.

Table 1 illustrates example data that may be stored as channel occupancy threshold data 308. As illustrated in Table 1, the example data includes two occupancy thresholds, namely occupancy thresholds of 70% and 80%. The 70% threshold corresponds to a reverse-link access channel of base station 108. The 80% threshold corresponds to a forward-link control channel of base station 108.

TABLE 1

| Channel Identifier Data | Occupancy Threshold |
| --- | --- |
| Reverse-link Access channel of BS 108 | 70% |
| Forward-link control channel of BS 108 | 80% |

Channel occupancy threshold data 308 may include an access channel identifier to identify the access channel. The access channel identifier may comprise a long code that uniquely identifies the access channel from other access channels of a given wireless coverage area pertaining to threshold data 308 and from access channels of wireless coverage areas near (for example, adjacent) to the given wireless coverage area.

Channel occupancy threshold data 308 may include a control channel identifier to identify the control channel. The control channel identifier may comprise a long code that uniquely identifies the control channel from other control channels of the given wireless coverage area pertaining to threshold data 308 and from control channels of wireless coverage areas near (for example, adjacent) to the given wireless coverage area.

Route-update-radius data 310 may comprise data that identifies one or more route-update-radii. Each route-update-radius may be associated with a base station. A given route-update-radius may be identified as a current route-update-radius. The current route-update-radius may be the route-update-radius that is associated with the base station to which access terminal 110 most-recently transmitted a route-update message. Table 2 illustrates an example of route-update-radius data 310. In Table 1, the units for each route-update-radius is kilometers. Alternatively, the units for one or more route-update-radius may be something other than kilometers, such as miles, yards, or some other type of units. In Table 2, each base station is identified by the reference number assigned to that base station in FIG. 1 and/or FIG. 2. Route-update-radius data 310 may include some other identifier for each base station, such as a sector identifier associated with each base station.

TABLE 2

| Base Station | Route-update-radius | Current route-update-radius |
| --- | --- | --- |
| 106 | 7 km | Yes |
| 108 | 9 km | No |
| 130 | 12 km | No |
| 132 | 10 km | No |

Base station location data 312 comprises data that identifies or that may be used to identify the locations of two or more base stations. As an example, the two or more base stations may include the base station to which access terminal 110 most-recently transmitted a route-update message and a base station that forms the coverage area where access terminal 110 is currently operating. The data that identifies or that may be used to identify the location of the two or more base stations may include latitude and longitude coordinates of each of those base stations.

As an example, base station location data 312 may contain data that identifies decimal values of a latitude and longitude of a base station location. For instance, the decimal value of the latitude may be 41.8780655 and the decimal value of the longitude may –87.6369603.

As another example, base station location data 312 may contain data that identifies the base station locations via degrees, minutes, and seconds. For instance, base station location data 312 may contain data that identify latitude and longitude coordinates of a base station as 41° 52' 41.2752" and –87° 38' 12.3072", respectively.

Channel occupancy measurement data 314 may comprise measurement data obtained by and/or generated by one or more base stations. The one or more base stations may include a base station that forms the coverage area where access terminal 110 is operating. The one or more base stations may also include a base station to which access terminal 110 most-recently transmitted a route-update message and one or more intervening base stations that formed wireless coverage areas where access terminal 110 operated after transmission of the most-recently transmitted route-update message and prior to access terminal 110 entering the current coverage area where it is operating.

The measurement data obtained by and/or generated by each base station may comprise measurement data for one or more channels to or from that base station. For example, the measurement data may include measurement data for a reverse-link access channel to the base station and/or measurement data for a forward-link control channel to the base station. The base station is operable to measure the occupancy of a channel to or from the base station so as to obtain the measurement data. The measurement data may comprise a percentage and an identifier of the channel to which the measurement data pertains. As an example, the measurement data may comprise data that indicates the occupancy of a reverse-link access channel of base station 106 is 51%. As another example, the measurement data may comprise data that indicates the occupancy of a forward-link control channel of base station 106 is 76%.

Transmission delay data 316 may include data that identifies a time-delay. The time-delay may indicate how long to delay transmission of a route-update message. Processor 302 may use a time-delay from transmission delay data 316 to delay transmission of a route-update message from transceiver 300. In one respect, threshold delay data 316 may identify a single time-delay, such as 60 seconds, 90 seconds, or 120 seconds. In another respect, threshold time delay data 316 may identify a plurality of time-delays. In this latter respect, a time-delay to use when performing a transmission delay may be based on an occupancy rate of the measured channel.

Table 3 illustrates example data that may be stored as transmission delay data 316. In Table 3, the time-delay and occupancy rate range in each row correspond to each other. If the occupancy rate for a channel to or from a base station is determined to be within a given occupancy rate range, then processor 302 can determine the time-delay to be the time-delay corresponding to the given occupancy rate range.

TABLE 3

| Occupancy Rate Range (ORR) | Time-delay |
| --- | --- |
| ORR < 80 % | 60 seconds |
| 80% < ORR ≦ 85% | 90 seconds |
| 85% < ORR ≦ 90% | 120 seconds |
| 90% < ORR ≦ 95% | 180 seconds |
| 95% < ORR | 240 seconds |

Threshold speed data 318 may include data that identifies a threshold speed that processor 302 and/or access terminal 110 uses to determine whether access terminal 110 is mobile or not mobile. Threshold speed data 318 may be specified in any of a variety of units, such as km/hour, miles/hour, or some other units. As an example, the threshold speed is a speed that is greater than 0 km/hour. For instance, the threshold speed may be 15 km/hour, 20 km/hour, 25 km/hour or some other specified speed. Other examples of the threshold speed identified by threshold speed data 318 are also possible. Access terminal 110 may receive data from RAN 102 or another network, such as a global positioning system (GPS) having a plurality of satellites so that processor 302 can determine the speed of access terminal 110.

Computer-readable program instructions 320 may comprise a variety of program instructions. For example, computer-readable program instructions 320 may include program instructions that are executable to identify the locations of two base stations from base station location data 312, determine a distance between those two base stations, and compare that determined distance to a route-update-radius of route-update-radius data 310 so as to determine whether the distance between the two base stations is less than, equal to, or greater than the route-update-radius of route-update-radius data 310. For purposes of this description, those program instructions are referred to as location-distance program instructions. As an example, the location-distance program instruction are executable to determine the distance between base stations 106 and 108, and determine whether a distance between base stations 106 and 108 (for example, 9 km) exceeds the route-update-radius of base station 106 (for example, a base station to which access terminal 110 last sent a route-update message).

Computer-readable program instructions 320 may include program instructions that are executable to determine whether occupancy of a channel to or from a base station exceeds a channel occupancy threshold of channel occupancy threshold data 308. For purposes of this description, those program instructions are referred to as occupancy-comparison program instructions. The channel to or from the base station is a channel of the coverage area where access terminal 110 is currently operating.

Computer-readable program instructions 320 may include program instructions that are executable to determine whether access terminal 110 is mobile. For purposes of this description, those program instructions are referred to as mobility-determination instructions. Execution of the mobility-determination instructions may include processor 302 determining a speed at which access terminal 110 is moving, and comparing the determined speed at which access terminal 110 is moving to threshold speed data 318. If access terminal 110 is moving at a speed greater than threshold speed data 318, execution of the mobility-determination instructions allows processor 302 to determine that access terminal 110 is mobile. If access terminal 110 is moving at a speed less than threshold speed data 318, execution of the mobility-determination instructions allows processor 302 to determine that access terminal 110 is not mobile. If access terminal 110 is moving at a speed equal to threshold speed data 318, execution of the mobility-determination instructions may allow processor 302 to determine that access terminal 110 is mobile or may allow processor 302 to determine that access terminal 110 is not mobile.

Computer-readable program instructions 320 may include program instructions that are executable to perforin a transmission delay. For purposes of this description, those program instructions are referred to as transmission-delay instructions. Performance of the transmission delay may be carried out in various ways. For example, performance of the transmission delay may include access terminal 110 (in particular, processor 302) counting and/or waiting an amount of time equal to a time-delay (maintained in transmission delay data 316) prior to transmitting a next (for example, a second) route-update message. In accordance with this example, access terminal 110 (in particular, processor 302) may initiate counting and/or waiting the amount of time equal to the time delay after the access terminal 110 and/or processor 302 determines that the occupancy of a given channel exceeds a channel occupancy threshold maintained in channel occupancy threshold data 308 and after the access terminal 110 and/or processor 302 determines that access terminal 110 is mobile.

Computer-readable program instructions 320 may include program instructions that are executable to cause transceiver 300 to transmit a route-update message to a base station that forms a coverage area where access terminal 110 is currently operating. For purposes of this description, those program instructions are referred to as route-update-message-transmission instructions. Execution of the route-update-message-transmission instructions may include processor 302 determining that a route-update message is to be transmitted to a base station, executing the program instructions to perform the transmission delay, and then providing the route-update message to transceiver 300 for transmission of the route-update message to the base station. Alternatively, execution of the route-update-message-transmission instructions may include processor 302 determining that a route-update message is to be transmitted to a base station, and then providing the route-update message to transceiver 300 for transmission of the route-update message to the base station, without executing the program instructions to perform the transmission delay.

III. Example Operation

Figure 4:
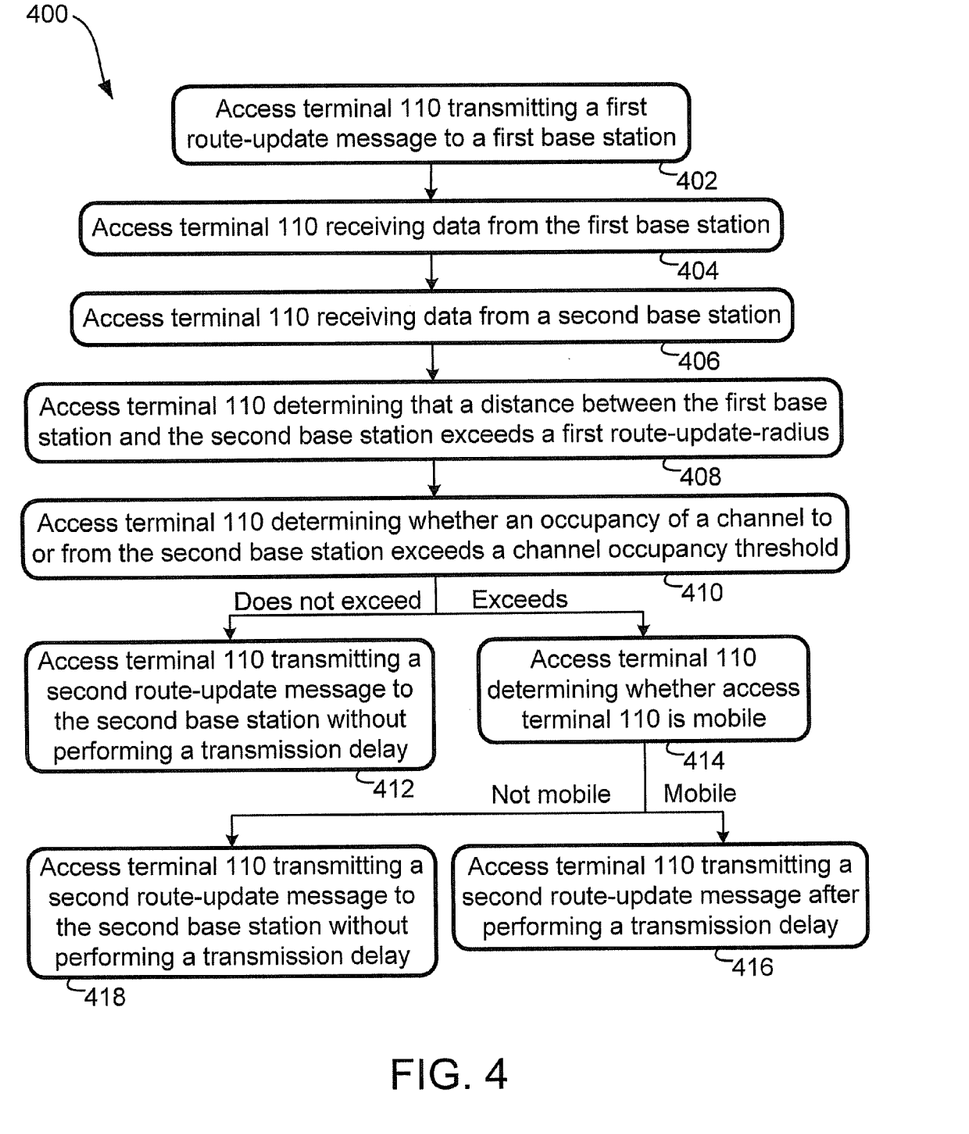
FIG. 4 is a flow chart depicting a set of functions that may be carried out in accordance with an example embodiment.

Next, FIG. 4 is a flow chart that illustrates a set of functions 400 that may be carried out in accordance with an example embodiment. Block 402 of FIG. 4 refers to a first route-update message and blocks 412, 416, and 418 of FIG. 4 refer to a second route-update message. The second route-update message can be the next route-update message that access terminal 110 transmits after transmitting the first route-update message.

Referring to FIG. 4, block 402 includes access terminal 110 transmitting a first route-update message to a first base station (for example, base station 106). Transmission of the first route-update message may occur via a reverse-link access channel between access terminal 110 and base station 106 while access terminal 110 is operating in coverage area 134. After receiving the first route-update message, the first base station can forward the first route-update message or data contained within the first route-update message to RNC 104 for subsequent updating of routing information associated with access terminal 110.

Next, block 404 includes access terminal 110 receiving data from the first base station (for example, base station 106). Access terminal 110 may receive the data while access terminal 110 is operating in coverage area 134. Transmission of the data from base station 106 to access terminal 110 may occur via a forward-link control channel between base station 106 and access terminal 110, and in particular, via a sector-parameters message or another message transmitted via that control channel.

The data received at access terminal 110 from base station 106 may include (i) a route-update-radius that is associated with base station 106 or with a coverage area formed by base station 106, (ii) a latitude of a location where base station 106 is located, and (iii) a longitude of the location where base station 106 is located. After receiving the data from base station 106, access terminal 110 may store the data in computer-readable data storage device 304. Similar data from other base stations may be received by access terminal 110 when access terminal 110 is operating in coverage areas formed by the other base stations.

Next, block 406 includes access terminal 110 receiving data from a second base station (for example, base station 108). For purposes of this description, the route-update-radius associated with base station 108 (for example, 9 km) is referred to as a second route-update-radius.

Access terminal 110 may receive the data from base station 108 while access terminal 110 is operating in coverage area 136. Transmission of the data from base station 108 to access terminal 110 may occur via a forward-link control channel between base station 108 and access terminal 110, and in particular, via a sector-parameters message or another message transmitted via that control channel. After receiving the data from base station 108, access terminal 110 may store the data in computer-readable data storage device 304.

The data received at access terminal 110 from base station 108 may include (i) a route-update-radius associated with base station 108 or associated with a coverage area foamed by base station 108, (ii) a latitude of a location where base station 108 is located, and (iii) a longitude of the location where base station 108 is located.

The data received at access terminal 110 from base station 108 may include (i) channel occupancy threshold data associated with a channel to or from the second base station (for example, data storable as channel occupancy threshold data 308), and (ii) data useable by access terminal 110 to determine whether the occupancy of the channel to or from the second base station exceeds the channel occupancy threshold for that channel (for example, channel occupancy measurement data 314). The latter data may include channel occupancy measurement data regarding a particular channel to or from the second base station.

The data received at access terminal 110 from base station 108 may include data that indicates one or more time-delays and that can be stored as transmission delay data 316, and threshold speed data 318.

The data received at access terminal 110 from base station 108 may also include base-station-distance data that indicates distances between the second base station and one or more other base stations. For example, the one or more other base stations may comprise the base stations that are within a given range of the second base station and/or the base stations that are classified as neighbor base stations to the second base station. As another example, the base-station-distance data may include data that indicates one or more of distances 142, 144, 146, 148, 150, and 152. Data, similar to the data received from base station 108 when access terminal 110 is operating in a coverage area formed by base station 108 but relevant to another base station, may be received by access terminal 110 when access terminal 110 is operating in a coverage area formed by the other base station.

Next, block 408 includes access terminal 110 determining that a distance (for example, distance 144 (9 km)) between the first base station (for example, base station 106) and the second base station (for example, base station 108) exceeds a first route-update-radius (for example, 7 km). Access terminal 110 may make the determination of block 408 after moving from coverage area 134 to coverage area 136.

The distance between the first base station and the second base station may be compared to the first route-update radius for the determination of block 408 because access terminal 110 is operating in coverage area 136 and because the first base station is the most-recent base station to which access terminal 110 transmitted a route-update message. Making the determination of block 408 may include processor 302 executing the location-distance program instructions of program instructions 320.

In one respect, access terminal 110 may determine the distance between base station 106 and base station 108 by determining the distance between the location indicated by the latitude and longitude where base station 106 is located and the location indicated by the latitude and longitude where base station 108 is located. In another respect, access terminal 110 may determine the distance between base station 106 and base station 108 from base-station-distance data received at access terminal 110.

Next, block 410 includes access terminal 110 determining whether an occupancy of a channel to or from the second base station (for example, base station 108) exceeds a channel occupancy threshold.

Access terminal 110 may compare the occupancy of a channel to or from the second base station to the channel occupancy threshold in block 410 because access terminal 110 is operating in coverage area 136 and because access terminal 110 has determined that distance 144 exceeds the first route-update-radius. If the second base station forms more than one coverage area, the channel to or from the second base station comprises a channel of the coverage area in which access terminal 110 is operating.

If access terminal 110 determines that the occupancy of the channel to or from base station 108 does not exceed the channel occupancy threshold, access terminal 110 continues operation at block 412. Otherwise, if access terminal 110 determines that the occupancy of the channel to or from base station 108 exceeds the channel occupancy threshold, access terminal 110 continues operation at block 414.

Processor 302 may execute the occupancy-comparison program instructions of program instructions 320 to make the determination of block 410. Access terminal 110, and in particular, processor 302, may obtain a channel occupancy measurement from channel occupancy measurement data 314 and compare that measurement to a channel occupancy threshold from channel occupancy threshold data 308. The channel occupancy measurement and the channel occupancy threshold may both be associated with the channel to or from the second base station, such as a reverse-link access channel, a forward-link control channel, or some other channel.

Next, block 412 includes access terminal 110 transmitting a second route-update message to the second base station (for example, base station 108) without performing a transmission delay. For block 412, processor 302 may execute the route-update-message-transmission instructions of program instructions 320 to cause transceiver 300 to transmit the second route-update message.

Next, block 414 includes access terminal 110 determining whether access terminal 110 is mobile. Processor 302 may execute the mobility-determination instructions of program instructions 320 to make the determination of block 414. Access terminal 110 makes the determination at block 414 so as to determine whether to delay transmission of the second route-update message. Delaying transmission of the second route-update message after making the determination of block 414 may allow access terminal 110 to move outside of coverage area 136 and into another coverage area that has communication channels that are not as highly-occupied as the communication channels to or from the second base station. Alternatively, delaying transmission of the second route-update message after making the determination of block 414 may allow access terminal 110 to transmit the second route-update message to the second base station after occupancy of the channel to or from the second base station has decreased (for example, to a level below the channel occupancy threshold).

If access terminal 110 determines that it is mobile, then access terminal 110 continues operation at block 416. Otherwise, if access terminal 110 determines that it is not mobile, then access terminal 110 continues operation at block 418.

Next, block 416 includes access terminal 110 transmitting a second route-update message after performing a transmission delay. For block 416, processor 302 may execute the transmission-delay instructions of program instructions 320 to perform the transmission delay and processor 302 may execute the route-update-message-transmission instructions of program instructions 320 to cause transceiver 300 to transmit the second route-update message. For block 416, transmission of the second route-update message may include transceiver 300 transmitting the message to (i) the second base station if, after performance of the transmission-delay, access terminal 110 is still operating in coverage area 136, or (ii) a base station other than the second base station if, after performance of the transmission-delay, access terminal 110 is operating in a coverage area other than coverage area 136.

Performing the transmission delay at block 416 may include access terminal 110 determining a time-delay that indicates how long to delay transmission of the second route-update message. Processor 302 may determine the time-delay from transmission delay data 316. Processor 302 may compare a channel occupancy measurement of the channel to or from the second base station to the transmission delay data 316 to determine the time-delay.

Performing the transmission delay may include access terminal 110, in particular, processor 302 or transceiver 300, counting an amount of time equal to the time-delay prior to transmitting the second route-update message. Access terminal 110 may initiate the counting (of the amount of time equal to the time-delay) after access terminal 110 determines that the occupancy of the channel to or from the second base station exceeds the channel occupancy threshold and after access terminal 110 determines that access terminal 110 is mobile.

Performing the transmission delay may include access terminal 110, in particular, processor 302 or transceiver 300, waiting an amount of time equal to the time-delay prior to transmitting the second route-update message. Access terminal 110 may initiate the waiting (of the amount of time equal to the time-delay) after access terminal 110 determines that the occupancy of the channel to or from the second base station exceeds the channel occupancy threshold and after access terminal 110 determines that access terminal 110 is mobile.

Next, block 418 includes access terminal 110 transmitting a second route-update message to the second base station without performing a transmission delay. For block 418, processor 302 may execute the route-update-message-transmission instructions of program instructions 320 to cause transceiver 300 to transmit the second route-update message. After receiving the second route-update message, the second base station can forward the second route-update message or data contained within the second route-update message to RNC 104 for subsequent updating of routing information associated with access terminal 110.

Figure 5:
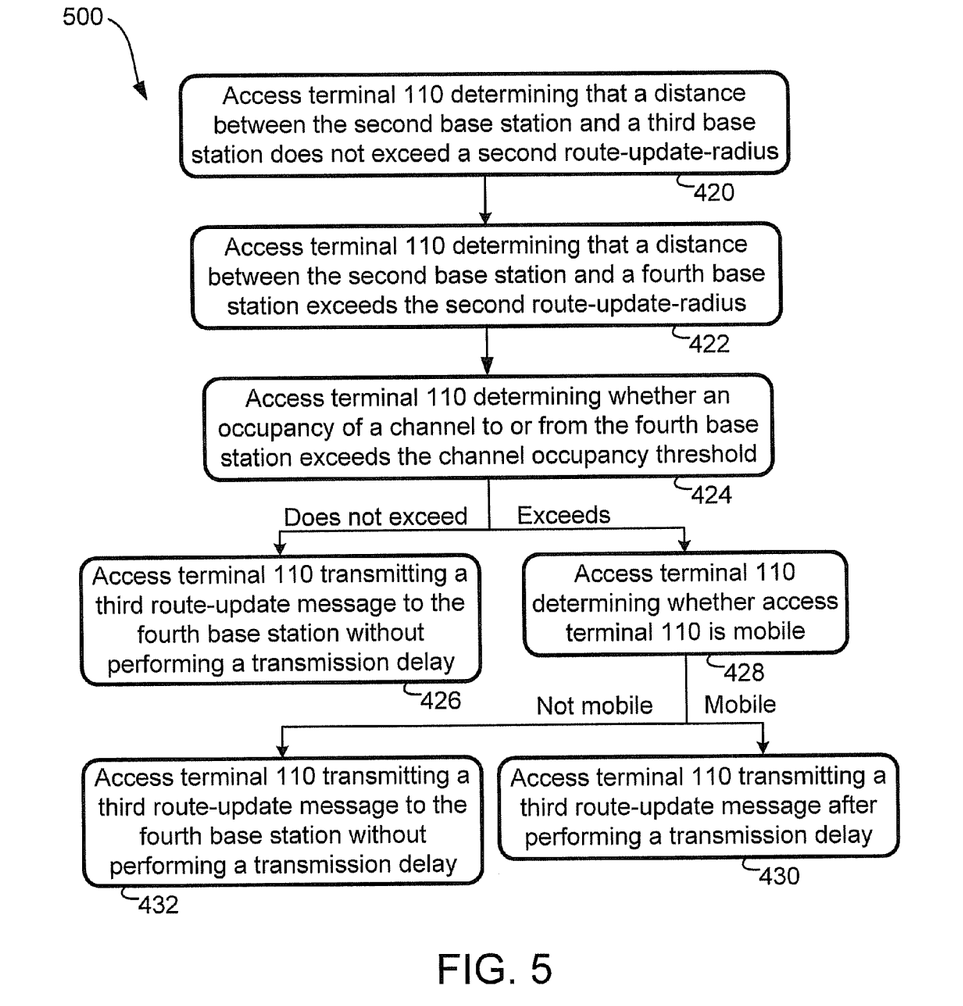
FIG. 5 is a flow chart depicting a set of functions that may be carried out in accordance with an example embodiment.

Next, FIG. 5 is a flow chart that illustrates a set of functions 500 that may be carried out in accordance with an example embodiment. The set of functions 500 may be carried out after one or more functions of the set of functions 400 are carried out. Blocks 426, 430, and 432 of FIG. 5 refer to a third route-update message. If the first route-update message and the second route-update message (referred to in FIG. 4) are transmitted in that order by access terminal 110, the third route-update message can be the next route-update message that access terminal 110 transmits after transmitting the second route-update message.

Referring to FIG. 5, block 420 includes access terminal 110 determining that a distance (for example, distance 146 (7 km)) between the second base station (for example, base station 108) and a third base station (for example, base station 130) does not exceed a second route-update radius (for example, 9 km). Access terminal 110 may make the determination of block 420 after moving from coverage area 136 to coverage area 140.

The distance between the second base station and the third base station may be compared to the second route-update radius for the determination of block 420 because access terminal 110 is operating in coverage area 140 and because the second base station is the most-recent base station to which access terminal 110 transmitted a route-update message. Making the determination of block 420 may include processor 302 executing the location-distance program instructions of program instructions 320. Access terminal 110 does not transmit a route-update message to the third base station or any other base station in response to making the determination of block 420.

Next, block 422 includes access terminal 110 determining that a distance (for example, distance 150 (10 km)) between the second base station (for example, base station 108) and a fourth base station (for example, base station 132) exceeds the second route-update radius (for example, 9 km). Access terminal 110 may make the determination of block 422 after moving from coverage area 140 to coverage area 138.

The distance between the second base station and the fourth base station may be compared to the second route-update radius for the determination of block 422 because access terminal 110 is operating in coverage area 138 and because the second base station is the most-recent base station to which access terminal 110 transmitted a route-update message. Making the determination of block 422 may include processor 302 executing the location-distance program instructions of program instructions 320.

Next, block 424 includes access terminal 110 determining whether an occupancy of a channel to or from the fourth base station (for example, base station 132) exceeds the channel occupancy threshold. The channel occupancy threshold of block 424 can be the same threshold referred to in block 412 or a different threshold of channel occupancy threshold data 308.

Access terminal 110 may compare the occupancy of a channel to or from the forth base station to the channel occupancy threshold in block 424 because access terminal 110 is operating in coverage area 138 and because access terminal 110 has determined that distance 150 exceeds the second route-update-radius. If the fourth base station forms more than one coverage area, the channel to or from the fourth base station comprises a channel of the coverage area in which access terminal 110 is operating.

If access terminal 110 determines that the occupancy of the channel to or from base station 132 does not exceed the channel occupancy threshold, access terminal 110 continues operation at block 426. Otherwise, if access terminal 110 determines that the occupancy of the channel to or from base station 132 exceeds the channel occupancy threshold, access terminal 110 continues operation at block 428.

Next, block 426 includes access terminal 110 transmitting a third route-update message to the fourth base station (for example, base station 132) without performing a transmission delay. For block 426, processor 302 may execute the route-update-message-transmission instructions of program instructions 320 to cause transceiver 300 to transmit the third route-update message.

Next, block 428 includes access terminal 110 determining whether access terminal 110 is mobile. Processor 302 may execute the mobility-determination instructions of program instructions 320 to make the determination of block 428. Access terminal 110 makes the determination at block 428 so as to determine whether to delay transmission of the third route-update message. Delaying transmission of the third route-update message after making the determination of block 428 may allow access terminal 110 to move outside of coverage area 138 and into another coverage area that has communication channels that are not as highly-occupied as the communication channels to or from the fourth base station. Alternatively, delaying transmission of the third route-update message after making the determination of block 428 may allow access terminal 110 to transmit the third route-update message to the fourth base station after occupancy of the channel to or from the fourth base station has decreased (for example, to a level below the channel occupancy threshold).

If access terminal 110 determines that it is mobile, then access terminal 110 continues operation at block 430. Otherwise, if access terminal 110 determines that it is not mobile, then access terminal 110 continues operation at block 432.

Next, block 430 includes access terminal 110 transmitting a third route-update message after performing a transmission delay. For block 430, processor 302 may execute the transmission-delay instructions of program instructions 320 to perform the transmission delay and processor 302 may execute the route-update-message-transmission instructions of program instructions 320 to cause transceiver 300 to transmit the third route-update message. For block 430, transmission of the third route-update message may include transceiver 300 transmitting the message to (i) the fourth base station if, after performance of the transmission-delay, access terminal 110 is still operating in coverage area 138, or (ii) a base station other than the fourth base station if, after performance of the transmission-delay, access terminal 110 is operating in a coverage area other than coverage area 138.

Performing the transmission delay at block 430 may include access terminal 110 determining a time-delay that indicates how long to delay transmission of the third route-update message. Processor 302 may determine the time-delay from transmission delay data 316. Processor 302 may compare a channel occupancy measurement of the channel to or from the fourth base station to the transmission delay data 316 to determine the time-delay.

Performing the transmission delay may include access terminal 110, in particular, processor 302 or transceiver 300, counting an amount of time equal to the time-delay prior to transmitting the third route-update message. Access terminal 110 may initiate the counting (of the amount of time equal to the time-delay) after access terminal 110 determines that the occupancy of the channel to or from the fourth base station exceeds the channel occupancy threshold and after access terminal 110 determines that access terminal 110 is mobile.

Performing the transmission delay may include access terminal 110, in particular, processor 302 or transceiver 300, waiting an amount of time equal to the time-delay prior to transmitting the third route-update message. Access terminal 110 may initiate the waiting (of the amount of time equal to the time-delay) after access terminal 110 determines that the occupancy of the channel to or from the fourth base station exceeds the channel occupancy threshold and after access terminal 110 determines that access terminal 110 is mobile.

Next, block 432 includes access terminal 110 transmitting a third route-update message to the fourth base station without performing a transmission delay. For block 432, processor 302 may execute the route-update-message-transmission instructions of program instructions 320 to cause transceiver 300 to transmit the third route-update message. After receiving the third route-update message, the fourth base station can forward the third route-update message or data contained within the third route-update message to RNC 104 for subsequent updating of routing information associated with access terminal 110.

IV. Conclusion

Example embodiments of the present invention have been described above. Those skilled in the art will understand that changes and modifications may be made to the described embodiments without departing from the true scope and spirit of the present invention, which is defined by the claims.

We claim:

1. A method comprising:
   an access terminal transmitting a first route-update message to a first base station, wherein the first base station is associated with a first route-update-radius;
   the access terminal determining that a distance between the first base station and a second base station exceeds the first route-update-radius and the access terminal determining whether an occupancy of a channel to or from the second base station exceeds a channel occupancy threshold;
   if the access terminal determines that the occupancy of the channel to or from the second base station does not exceed the channel occupancy threshold, then the access terminal transmitting a second route-update message to the second base station without performing a transmission delay; and
   if the access terminal determines that the occupancy of the channel to or from the second base station exceeds the channel occupancy threshold, then the access terminal determining whether the access terminal is mobile, and if the access terminal determines that the access terminal is mobile, then the access terminal transmitting the second route-update message after performing the transmission delay, otherwise, if the access terminal determines that the access terminal is not mobile, then the access terminal transmitting the second route-update message to the second base station without performing the transmission delay.

2. The method of claim 1, further comprising:
   the access terminal receiving, from the second base station, data useable by the access terminal to determine whether the occupancy of the channel to or from the second base station exceeds the channel occupancy threshold.

3. The method of claim 2, further comprising:
   the access terminal receiving, from the second base station, data that indicates the channel occupancy threshold.

4. The method of claim 2, wherein the channel to or from the second base station comprises a forward-link control channel or a reverse-link access channel.

5. The method of claim 1, further comprising:
   the access terminal receiving, from the first base station, data that comprises the first route-update-radius, a latitude of a location where the first base station is located, and a longitude of the location where the first base station is located,
   the access terminal receiving, from the second base station, data that comprises a latitude of a location where the second base station is located and a longitude of the location where the second base station is located; and
   the access terminal using the latitude of the location where the first base station is located, the longitude of the location where the first base station is located, the latitude of the location where the second base station is located, and the longitude of the location where the second base station is located to determine the distance between the first base station and the second base station.

6. The method of claim 1, further comprising:
   the access terminal maintaining, in a computer-readable data storage device, a time-delay that indicates how long to delay transmission of the second route-update message,
   wherein performing the transmission delay comprises the access terminal counting an amount of time equal to the time-delay prior to transmitting the second route-update message, and wherein the access terminal initiates the counting after the access terminal determines that the occupancy of the channel exceeds the channel occupancy threshold and after the access terminal determines that the access terminal is mobile.

7. The method of claim 1, further comprising:

the access terminal maintaining, in a computer-readable data storage device, a time-delay that indicates how long to delay transmission of the second route-update message, wherein performing the transmission delay comprises the access terminal waiting an amount of time equal to the time-delay prior to transmitting the second route-update message, and wherein the access terminal initiates the waiting after the access terminal determines that the occupancy of the channel exceeds the channel occupancy threshold and after the access terminal determines that the access terminal is mobile.

8. The method of claim 1, further comprising:

the access terminal receiving channel occupancy measurement data from the second base station; and the access terminal determining a time-delay that indicates how long to delay transmission of the second route-update message, wherein the time-delay corresponds to the channel occupancy measurement data;

wherein performing the transmission delay comprises the access terminal counting an amount of time equal to the time-delay prior to transmitting the second route-update message, and wherein the access terminal initiates the counting after the access terminal determines that the occupancy of the channel exceeds the channel occupancy threshold and after the access terminal determines that the access terminal is mobile.

9. The method of claim 1, wherein the first base station forms a first coverage area, the second base station forms a second coverage area, a third base station forms a third coverage area, and a fourth base station forms a fourth coverage area, wherein the method further comprises:

the access terminal receiving, from the second base station, a second route-update-radius that is associated with the second base station;

the access terminal moving from the second coverage area to the third coverage area;

the access terminal determining that a distance between the second base station and the third base station does not exceed the second route-update-radius;

the access terminal moving from the third coverage area to the fourth coverage area;

the access terminal determining that a distance between the second base station and the fourth base station exceeds the second route-update-radius and the access terminal determining whether an occupancy of a channel to or from the fourth base station exceeds the channel occupancy threshold;

if the access terminal determines that the occupancy of the channel to or from the fourth base station does not exceed the channel occupancy threshold, then the access terminal transmitting a third route-update message to the fourth base station without performing the transmission delay; and if the access terminal determines that the occupancy of the channel to or from the fourth base station exceeds the channel occupancy threshold, then the access terminal determining whether the access terminal is mobile, and if the access terminal determines that the access terminal is mobile, then the access terminal transmitting the third route-update message to the fourth base station after performing the transmission delay, otherwise, if the access terminal determines that the access terminal is not mobile, then the access terminal transmitting the third route-update message without performing the transmission delay.

10. The method of claim 1, wherein the access terminal determining whether the access terminal is mobile comprises the access terminal determining whether the access terminal is moving at a speed greater than or equal to a threshold speed, wherein the threshold speed is greater than 0 kilometers per hour, wherein the access terminal determines the access terminal is mobile if the access terminal is determined to be moving at a speed greater than or equal to the threshold speed, and wherein the access terminal determines the access terminal is not mobile if the access terminal is determined to be moving at a speed that is less than the threshold speed.

11. The method of claim 10, wherein the threshold speed is greater than or equal to 15 kilometers per hour.

12. The method of claim 1, wherein if the access terminal determines that the access terminal is mobile, the access terminal transmitting the second route-update message after performing the transmission delay comprises the access terminal transmitting the second route-update message to the second base station.

13. The method of claim 1, wherein if the access terminal determines that the access terminal is mobile, the access terminal transmitting the second route-update message after performing the transmission delay comprises the access terminal transmitting the second route-update message to a base station other than the second base station.

14. A system comprising:

an access terminal to transmit a first route-update message to a first base station, wherein the first base station is associated with a first route-update-radius;

wherein the access terminal makes a determination that a distance between the first base station and a second base station exceeds the first route-update-radius;

wherein the access terminal determines whether an occupancy of a channel to or from the second base station exceeds a channel occupancy threshold;

if the access terminal determines that the occupancy of the channel to or from the second base station does not exceed the channel occupancy threshold, then the access terminal transmits a second route-update message to the second base station without performance of a transmission delay; and if the access terminal determines that the occupancy of the channel to or from the second base station exceeds the channel occupancy threshold, then the access terminal determines whether the access terminal is mobile, and if the access terminal determines that the access terminal is mobile, then the access terminal transmits the second route-update message after performance of the transmission delay, otherwise, if the access terminal determines that the access terminal is not mobile, then the access terminal transmits the second route-update message to the second base station without performance of the transmission delay.

15. The system of claim 14, further comprising:

the first base station; and the second base station, wherein the first base station transmits the first route-update-radius to the access terminal while the access terminal operates within a coverage area formed by the first base station, and wherein the second base station transmits to the access terminal data that indicates the occupancy of the channel to or from the second base station.

16. The system of claim 15, wherein the second base station measures the occupancy of the channel to or from the second base station and to generate a sector-parameters message that includes the data that indicates the occupancy of the channel to or from the second base station, and wherein the second base station transmits the data that indicates the occupancy of the channel to or from the second base station via transmission of the sector-parameters message.

17. The system of claim 14, wherein the access terminal does not transmit any other route-update message between transmission of the first route-update message and transmission of the second route-update message.

18. A wireless access terminal comprising:

a transceiver to transmit a first route-update message to a first base station;

a processor to execute computer-readable program instructions; and a computer-readable data storage device to store the computer-readable program instructions and a first route-update-radius associated with the first base station, wherein the computer-readable program instructions comprise first instructions executable by the processor to determine that a distance between the first base station and a second base station exceeds the first route-update-radius, wherein the computer-readable program instructions comprise second instructions executable by the processor to determine whether an occupancy of a channel to or from the second base station exceeds a channel occupancy threshold, wherein the computer-readable program instructions comprise third instructions executable by the processor to cause the transceiver to transmit a second route-update message to the second base station without performance of a transmission delay, wherein the computer-readable program instructions comprise fourth instructions executable by the processor to (i) determine whether the access terminal is mobile, and (ii) if the processor determines that the access terminal is mobile, cause the transceiver to transmit the second route-update message after performance of the transmission delay, otherwise, if the processor determines that the access terminal is not mobile, cause the transceiver to transmit the second route-update message to the second base station without performance of the transmission delay, wherein the processor executes the third instructions if the processor determines that the occupancy of the channel to or from the second base station does not exceed the channel occupancy threshold, and wherein the processor executes the fourth instructions if the processor determines that the occupancy of the channel to or from the second base station exceeds the channel occupancy threshold.

19. The wireless access terminal of claim 18, wherein the computer-readable data storage device comprises the channel occupancy threshold.

20. The wireless access terminal of claim 18, wherein the transceiver receives channel occupancy measurement data from the second base station, wherein the computer-readable data storage devices comprises time-delay data from which the processor can determine a time-delay that indicates how long to delay transmission of the second route-update message, wherein the determined time-delay corresponds to the channel occupancy measurement data, wherein performance of the transmission delay comprises execution of program instruction to count an amount of time equal to the time-delay, and wherein the processor executes the program instructions to count after the access terminal determines the occupancy of the channel exceeds the channel occupancy threshold, after the access terminal determines the access terminal is mobile, and prior to transmission of the second route-update message.

* * * * *